(12) United States Patent
Nilsson et al.

(10) Patent No.: US 10,212,660 B2
(45) Date of Patent: Feb. 19, 2019

(54) ANTENNA SELECTION IN DISCONTINUOUS RECEPTION MODE

(71) Applicant: Telefonaktiebolaget LM Ericsson (publ), Stockholm (SE)

(72) Inventors: Andreas Nilsson, Göteborg (SE); Fredrik Athley, Kullavik (SE); Sven Petersson, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 94 days.

(21) Appl. No.: 15/326,899

(22) PCT Filed: Oct. 19, 2016

(86) PCT No.: PCT/SE2016/051019
§ 371 (c)(1),
(2) Date: Jan. 17, 2017

(87) PCT Pub. No.: WO2018/074955
PCT Pub. Date: Apr. 26, 2018

(65) Prior Publication Data
US 2018/0213476 A1    Jul. 26, 2018

(51) Int. Cl.
*H04W 52/02* (2009.01)
*H04W 72/02* (2009.01)
(Continued)

(52) U.S. Cl.
CPC ...... *H04W 52/0216* (2013.01); *H04B 7/0802* (2013.01); *H04B 7/0877* (2013.01);
(Continued)

(58) Field of Classification Search
CPC ............. H04W 52/0216; H04W 72/02; H04W 72/085
See application file for complete search history.

(56) References Cited

U.S. PATENT DOCUMENTS

2010/0197231 A1*  8/2010  Kenington ............. H04B 1/525
                                                    455/63.1
2013/0182587 A1    7/2013  Sebeni et al.
(Continued)

FOREIGN PATENT DOCUMENTS

WO    2013009506 A2    1/2013
WO    2013063116 A1    5/2013

OTHER PUBLICATIONS

International Search Report and Written Opinion dated Jul. 3, 2017 for International Application Serial No: PCT/SE2016/051019, International Filing Date: Oct. 19, 2016 consisting of 12-pages.

*Primary Examiner* — Ronald B Abelson
(74) *Attorney, Agent, or Firm* — Christopher & Weisberg, P.A

(57) ABSTRACT

A multi-antenna wireless device is equipped with a plurality of selectively operable radio chains. In an active mode or during a listening period of an energy-saving mode, the wireless device measures a quality characteristic of a signal, which it receives from a network node. During a non-listening period of the energy-saving mode, the wireless device deactivates all of the radio chains. After the non-listening period, the wireless device activates a selected subset of the radio chains to receive a signal from the network node in a first listening period. The selected subset is determined on the basis of the measured quality characteristic.

24 Claims, 4 Drawing Sheets

(51) Int. Cl.
*H04W 72/08* (2009.01)
*H04B 7/08* (2006.01)
*H04W 76/28* (2018.01)
*H04W 4/38* (2018.01)
*H04W 72/04* (2009.01)

(52) U.S. Cl.
CPC ... *H04W 52/0219* (2013.01); *H04W 52/0229* (2013.01); *H04W 72/02* (2013.01); *H04W 72/085* (2013.01); *H04W 76/28* (2018.02); *H04W 4/38* (2018.02); *H04W 72/0446* (2013.01)

(56) References Cited

U.S. PATENT DOCUMENTS

| | | | |
|---|---|---|---|
| 2013/0242772 A1* | 9/2013 | Attar | H04B 7/0871 370/252 |
| 2013/0244665 A1* | 9/2013 | Clevorn | H04W 52/0245 455/437 |
| 2015/0271755 A1 | 9/2015 | Karri et al. | |

* cited by examiner

ANTENNA SELECTION IN DISCONTINUOUS RECEPTION MODE

CROSS-REFERENCE TO RELATED APPLICATIONS

This application is a Submission Under 35 U.S.C. § 371 for U.S. National Stage Patent Application of International Application Number: PCT/SE2016/051019, filed Oct. 19, 2016 entitled "ANTENNA SELECTION IN DISCONTINUOUS RECEPTION MODE," the entirety of which is incorporated herein by reference.

TECHNICAL FIELD

The present disclosure generally relates to a method implemented in a wireless device according to the preamble of claim 1 and a corresponding wireless device. In particular, the disclosure relates to energy-saving operation of a wireless device, in particular a telecommunication user equipment, in which active or listening periods are interrupted by non-listening periods.

BACKGROUND

Idle mode, discontinuous reception (DRX) mode and dormant mode are examples of energy-saving modes practiced in available mobile communication systems and expected to have equivalents in future systems. In an energy-saving mode, there are typically pre-agreed time periods (non-listening periods) during which no data will be transmitted from the network to the user equipments (UEs). During such time periods, in order to save energy, the UE may turn off its one or more radio receivers until the subsequent listening period begins or when an active (i.e., not explicitly energy-saving) mode is resumed. In some mobile communication systems, the characteristics of several energy-saving modes may be combined to reduce the energy consumption further, such as by applying DRX during dormant mode.

An energy-saving mode may be triggered by inactivity, such as when no data (e.g., no data packets) has been transmitted or received for a predefined amount of time. Typically all beam-related information is lost when the UE enters an energy-saving mode. When the UE leaves the non-listening period—when it either moves into a listening period or reenters active mode—it will therefore need to listen to a number of signals, in particular reference signals, to determine reliable beam-related information. According to proposals, such signals guiding adaptation may include Signature Sequence Index (SSI), Tracking RAN Area Signal (TRAS), Paging Indication Channel (PICH)/Paging Message Channel (PMCH).

In view of the large variety of requirements for the next generation of mobile communications system ("5G"), information relating to many different carrier frequencies will be needed. For example, low bands will be needed to ensure sufficient coverage and higher bands (e.g. at and above 30 GHz) will be needed to achieve the required capacity. At high frequencies the propagation properties are more challenging, and active beamforming may be required both at the base station and at the UE to reach a sufficient link budget. Higher frequencies generally increase the degree of directivity of UE antennas, which means that a single antenna element at high frequency typically will not offer omnidirectional or approximately omnidirectional coverage. It is therefore foreseen that multiple UE antenna elements with beam patterns pointing in different directions and with different polarizations will be preferred in order to improve the link budget and approach omnidirectional coverage.

UE beamforming is typically implemented by one of three basic approaches: analog, digital and hybrid (analog and digital beamforming combined), with respective advantages and challenges. Digital beamforming is the most flexible approach but also the costliest, mainly due to the large number of radios and baseband chains that it requires. Analog beamforming is the least flexible but typically cheaper to manufacture, as one radio and baseband chain may supply a plurality of antenna elements. Hybrid beamforming attempts to combine the advantages of analog and digital beamforming. Clearly the cost and performance requirements on a given UE will determine what beamforming approach will be applied.

As an effect of the expected multiplication of receive antennas per UE combined with the significantly broader frequency range foreseen for 5G, the acquisition of sufficient beam-related information at wakeup from a non-listening period will be a potentially demanding task for UEs. The embodiments disclosed herein seek to reduce the harmful impact that this task may have on overall UE performance.

SUMMARY

A first aspect relates to a method implemented in a wireless device, which is equipped with a plurality of selectively operable radio chains for communicating with at least one network node. The method comprises:
  measuring a quality characteristic of a signal received from the network node in an active mode or during a listening period of an energy-saving mode;
  deactivating all of the radio chains during a non-listening period of the energy-saving mode; and
  after the non-listening period, activating a selected subset of the radio chains to receive a signal from the at least one network node in a first listening period.

According to said first aspect, the selected subset is determined on the basis of the quality characteristic measured in the active mode or during a listening period of the energy-saving mode.

A second aspect relates to a wireless device comprising a communication interface with a plurality of selectively operable radio chains for communicating with at least one network node and comprising processing circuitry. The processing circuitry is configured to cause the wireless device to:
  measure a quality characteristic of a signal received from the network node in an active mode or during a listening period of an energy-saving mode;
  deactivate all of the radio chains during a non-listening period of the energy-saving mode; and
  after the non-listening period, activate a selected subset of the radio chains to receive a signal from the at least one network node in a first listening period.

According to the second aspect, the selected subset is determined on the basis of the measured quality characteristic.

A third aspect relates to a computer program with computer-executable instructions for performing the method of the first aspect, in particular by being executed by a programmable processor controlling a wireless device equipped with a plurality of selectively operable radio chains.

Common to the first, second and third aspects, the determination of the selected subset is made on the basis of a measurement in a preceding listening period of the energy-saving mode or of a measurement made while the wireless device was still in active mode. The wireless device thereby does not need to make fresh measurements of the quality characteristic. The three aspects are based on a realization that the receipt conditions do not change significantly if the time elapsed is limited and/or if the position and orientation of the wireless device are substantially unchanged.

The invention is defined by the independent claims, and example embodiment are defined by the dependent claims. It is noted that unless otherwise indicated, features may be combined to advantage even if recited in different claims.

BRIEF DESCRIPTION OF THE DRAWINGS

Example embodiment will now be described with reference to the accompanying drawings, on which.

Unless otherwise indicated, like reference numbers indicate like elements on the drawings.

DETAILED DESCRIPTION OF EXAMPLE EMBODIMENTS

In the following description, for purposes of explanation and not limitation, specific details are set forth (such as particular method steps) in order to provide a thorough understanding of the techniques presented herein. It will be apparent to one skilled in the art that the present techniques may be practiced in other embodiments that depart from these specific details. For example, while the following embodiments will be described with reference to 5G and also 4G networks, it will be appreciated that the technique presented herein is not limited to any type of cellular network access.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

While one-dimensional antenna arrays and subarrays are referred to in the specific examples described in this disclosure to explain the principles of the present disclosure, the present disclosure is also applicable to two-dimensional antenna arrays and/or two-dimensional subarrays. In this case, the radiation pattern is a function of two angles.

Certain terms used in the following detailed description of exemplary embodiments are defined as follows: "4G" is the fourth generation of mobile telecommunications technology as defined by the ITU in IMT Advanced, such as LTE including LTE-Advanced and LTE-Evolution. "5G" is the fifth generation of mobile telecommunications and wireless technology which is not yet fully defined but in an advanced draft stage within 3GPP.

Figure 1:
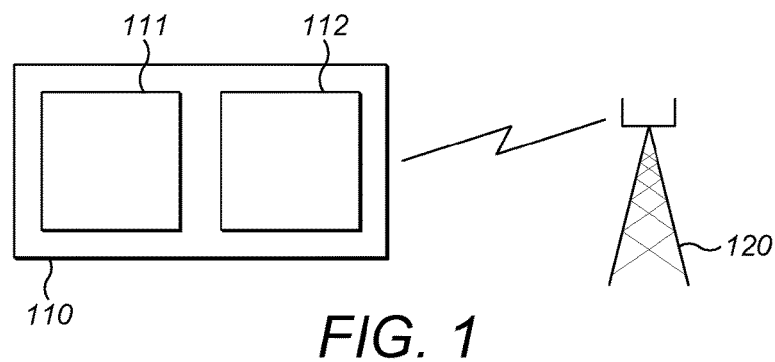
FIG. 1 discloses a wireless device in communication with a network node.

FIG. 1 shows a wireless device 110, a network node 120 and, as illustrated by the flash symbol, at least one wireless communication link between these. The wireless device 110 comprises processing circuitry 111, with capabilities for executing instructions and controlling other sections of the wireless device, and a communication interface 112 comprising a plurality of selectively operable radio chains suitable for communicating with the network node 120.

Figure 5:
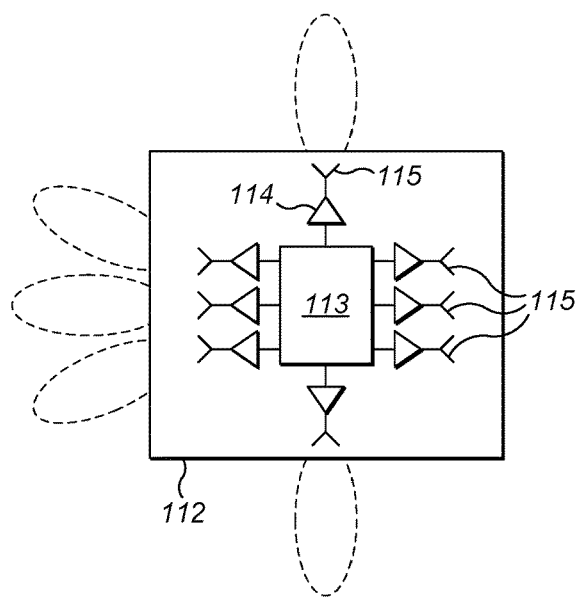
FIGS. 5-7 schematically illustrate communication interfaces suitable for a wireless device according to example embodiments.

FIG. 5 illustrates a possible implementation of the communication interface 112 of the wireless device 110. The communication interface 112 comprises baseband circuitry 113 and a total of eight antennas 115, each driven by digital radio circuitry 114. Each antenna 115 may be implemented as a single antenna or as an antenna array with multiple antenna elements. For illustration purposes, example radiation lobes have been drawn as dashed ovals extending from the respective antennas 115. As far as subscriber devices are concerned, the illustrated number of antennas 115 represents a typical implementation according to available technology for high frequency operation, where the radiation patterns of antenna elements have highly directive radiation pattern. In order to preserve a quasi-omnidirectional radiation pattern with reasonable spatial resolution, it may be necessary to arrange a plurality of antennas with different orientations spanning the angular space or a useful range thereof.

As the term is used herein, a radio chain (or radio branch) includes components or circuitry configured to receive, from the baseband circuitry 113, a baseband signal and apply signal processing, in particular amplification and/or digital signal processing, to generate a drive signal. The drive signal may be applied directly to the antenna(s) 115 associated with the radio chain. Alternatively, the drive signal is supplied to one or more modifier element (see item 116 in FIGS. 6 and 7), in particular one or more constant or variable passive elements, for modifying the drive signal and applying the modified drive signal to the antenna(s) 115. As explained in greater detail below, the modifier element(s) may be variable. A radio-related property of the radio chain, in particular a property of the modifier element, may be configured by a radio parameter that the radio chain accepts. The radio chain may accept the radio parameter in the form of a digital or analog control signal on an electric, wireless or optical carrier. A radio chain may extend from baseband circuitry to an antenna associated with the radio chain. Depending on the optional presence of modifier elements, the output signal of the radio chain may be the drive signal or the modified drive signal generated by the modifier element. While one radio chain may drive multiple antennas or multiple antenna elements of an antenna array, it normally receives a single baseband signal.

FIG. 5 shows an example of digital-type beamforming, where each instance of digital circuitry 114 drives a single antenna 115 or antenna element. Because none of the antennas 115 is preceded by a modifier element, the digital circuitry 114 may be described as a radio chain in the sense discussed above.

Figure 6:
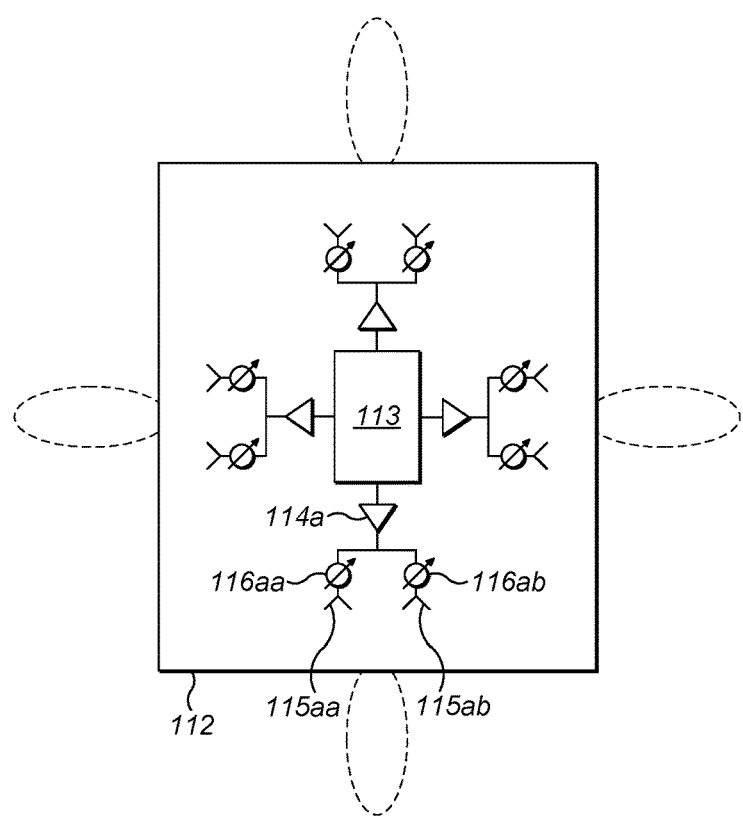

FIG. 6 shows a communication interface 112 using hybrid-type beamforming. The communication interface 112 comprises four instances of digital radio circuitry 114, each of which drives two antennas 115 via respective modifier elements 116. In particular, digital radio circuitry 114*a* drawn at the bottom of FIG. 6 drives a first antenna 115*aa* via a first modifier element 116*aa* and a second antenna 115*ab* via an optional second modifier element 116*ab*. The second modifier element 116*ab* is optional because it may be sufficient to realize, between the first 115*aa* and second 115*ab* antennas, a relative difference in a property (e.g., phase). It may not be necessary to influence the absolute values of the property in question. For this reason, in an advantageous variation of the communication interface 112, each instance of digital radio circuitry 114 drives two antennas 115, but only one of the antennas 115 is preceded by a modifier element 116.

In FIG. 6, the first and second modifier elements 116*aa*, 116*ab* are embodied as variable phase shifters, which are controllable independently of one another. For example, if the phase shifters are controllable by assigning a radio parameter representing a setting of the phase shifter, then the radio parameter for the first modifier element 116*aa* is assignable without affecting the radio parameter for the second modifier element 116*ab* and independently of an already assigned value of the radio parameter for the second modifier element.

The term phase shifter is used herein with reference to components designed and sold under this and similar names. The term is furthermore used in a functional sense recognizing that available components with different naming implement this functionality or may become available, with an equivalent effect, in coming years. In particular, a phase shifter may be an element modifying a phase of an electromagnetic wave emitted by an antenna or antenna element. For narrowband antenna equipment, the phase may be expressed in terms of angle or time. For mid- and wideband antenna equipment, the phase is preferably expressed as a single time value (true time delay), which may correspond to different angles for different emitted frequencies. It is known that phase shifters may comprise passive electric components (e.g., weights for achieving amplitude tapering), switches for connecting and disconnecting parasitic elements, actuators for modifying a geometry of an antenna or antenna array, or combinations of these.

Figure 7:
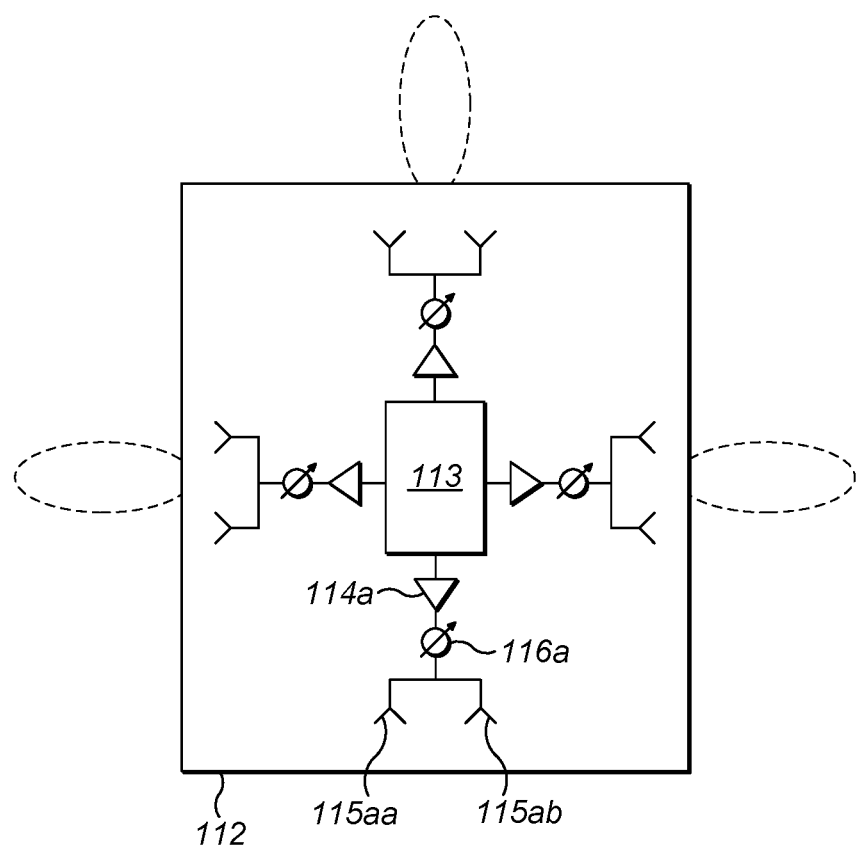

FIG. 7 shows a further communication interface using hybrid-type beamforming. As a notable difference to FIG. 6, each of the four instances of digital radio circuitry 114 is associated with a single modifier element 116 and two antenna elements 115. In particular, the lowermost digital radio circuitry 114*a* supplies a drive signal to modifier element 116*a*, which generates a modified drive signal that is supplied to the first and second antennas 115*aa*, 115*ab* downstream thereof. Accordingly, an operating value assigned to the radio parameter will be common to the first and second antennas 115*aa*, 115*ab*. The first and second antennas 115*aa*, 115*ab* may be of identical or different designs. If the first and second antennas 115*aa*, 115*ab* are of identical design, they may be differentiated by a pre-configured difference, in particular a relative difference, causing them to generate emit non-identical electromagnetic waves in response to being excited by an identical modified drive signal. The pre-configured difference may relate to a geometric separation, a geometric orientation, a phase modification property, a polarization property, or the like.

Figure 2:
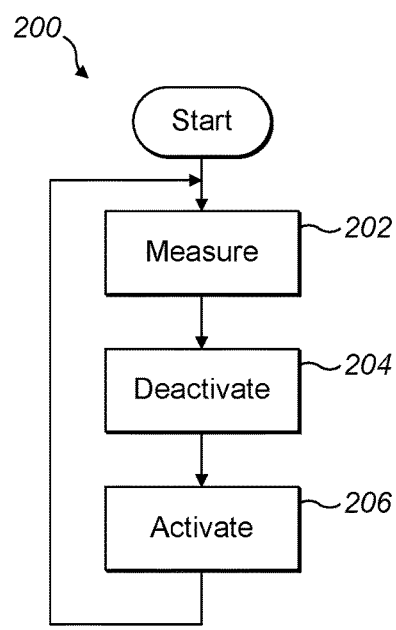
FIGS. 2-4 are flowcharts of methods according to example embodiments implemented in a wireless device.
Figure 3:
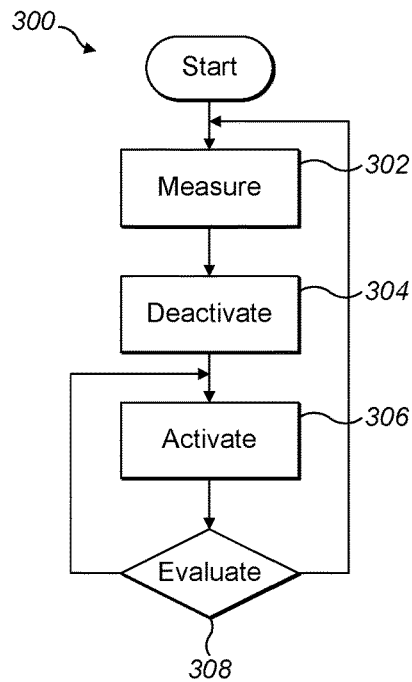
Figure 4:
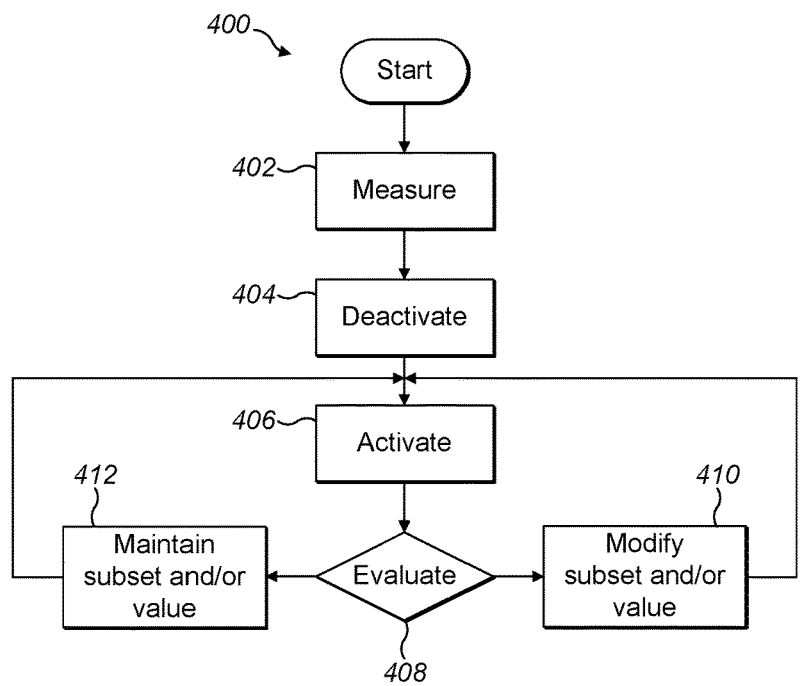

With reference to FIGS. 2-4, there will now be described methods implemented in the wireless device 110. The methods may be performed as a result of executing software loaded into the processing circuitry 111 of the wireless device 110, or as a result of instructions hardcoded into logic or components of the wireless device 110.

FIG. 2 illustrates a method 200 comprising a first step 202 of measuring a quality characteristic of a signal, which the wireless device 110 receives or has received from the network node 120 in an active mode or during a listening period of an energy-saving mode. The quality characteristic may be one or more of: received power, block error rate, frame error rate, an interference metric, signal-to-noise ratio (SNR), signal-to-(interference-plus-noise) ratio (SNIR).

In a second step 204, the wireless device 110 enters a non-listening period of the energy saving mode. In the non-listening period, the radio chains are deactivated. As used herein, deactivation of a radio chain may mean that the energy usage of the radio chain is significantly reduced or limited; the reduction may be achieved at the cost of some functionality or performance of the radio chain, such as suspending program execution, powering off or otherwise rendering the radio chain temporarily inoperable for its normal duties.

In a third step 206, when the non-listening period elapses and a first listening period begins, a selected subset of the radio chains is activated in order to receive a signal from the network node 120. Preferably, at least one of the radio chains stays deactivated in the first listening period. The selected subset of radio chains to be activated is determined on the basis of the quality characteristic as measured in step 202.

In some example embodiments, the duration of the non-listening period within the second step 204 is at least one millisecond or a couple of milliseconds, possibly longer than 10 ms. In other example embodiments, the duration of the second step 204 is one system subframe or a couple of subframes. Accordingly, the non-listening period may be significantly longer than an unused modulation symbol position within a subframe. The non-listening period may be chosen long enough to promise a non-negligible energy saving, also if any measures necessary for reactivation are taken into account. A periodicity of the non-listening period may correspond to a DRX period in a communication system for which the wireless device 110 is configured to operate. For purposes of illustration, it is noted that in a 3GPP LTE system, a subframe may correspond to 1 transmission time interval (TTI) or 1 ms, and allowed values of a so-called long DRX cycle are in the range from 10 ms to 2560 ms.

The method 300 depicted in FIG. 3 corresponds to a further example embodiment, which differs from the method 200 of FIG. 2 by including a feedback mechanism. In addition to steps 302, 304, 306, which are equivalent to steps 202, 204, 206, the method 300 includes a further step 308 of evaluating a channel condition under which the signal from the network node 120 is received. The evaluating step 308 may be performed during the first listening period. The evaluating step 308 may correspond to a separate activity, such as a measurement, or may be derived from conventional receiver-side processing steps. As an example of the latter option, it may be ascertained whether and with what frequency a representative decoding step completes successfully. It is also possible to execute the evaluating step 308 as part of a measurement of the quality characteristic.

In one example embodiment, when the evaluation step 308 reveals that the channel condition is sufficient (e.g., with respect to a predefined threshold on a parameter descriptive of the channel condition), the selected subset of radio chains may be maintained for a second listening period occurring after the first listening period. The execution then moves from the evaluating step 308 back to the activation step 306. If instead the evaluating step 308 reveals that the channel condition is insufficient (e.g., with respect to the same threshold), the selection of the subset of radio chains may be repeated or revised, fully or in part, before or at the second listening period. The execution then transitions from the evaluating step 308 back to the measuring step 302 and continues from there onwards.

In an example embodiment, at least some of the radio chains accept a radio parameter for controlling a radio-related parameter of the radio chain. Then, in step 308, a determination that the evaluated channel condition is insufficient may trigger an additional or alternative reaction of assigning a modified operating value to the radio parameter, before or at the second listening period. It is noted that the original value of the radio parameter may have been assigned on the basis of the measurement, in step 302, of the quality characteristic. In particular, the quality characteristic may have been measured for a plurality of values of the radio parameter, which have then been evaluated (e.g., optimized or ranked) based on the quality characteristics.

Example embodiments propose different ways of determining the modified subset and/or the modified operating value. For the sake of simplicity, the discussion in this paragraph will refer to the selection of subsets of radio chains, but applies equivalently to the determination of an operating value to be assigned to the at least one radio parameter.

A first option is that the measured quality characteristic is used not only for selecting a preferred subset of the radio chains but also for selecting a second most preferred subset and an optional third most preferred subset etc. For example, a wireless device 110 equipped with eight radio chains determines based on a measurement of the quality characteristic that a subset A={2, 4} is likely to provide optimal performance $P_A$ (measured by a metric for which a greater value represents a more advantageous operating condition, e.g., a metric being a ratio of total received power to energy dissipation of the radio chains), a subset B={2, 5, 8} is likely to have second best performance $P_B$, and a further subset C={1, 4, 8} is likely to provide a performance $P_C$, where $P_C \leq P_B \leq P_A$. Returning to the general description of the first option, the most preferred subset of radio chains is activated during a first listening period and is maintained for the second listening period if the evaluated channel condition is deemed sufficient. If the evaluated channel condition is deemed insufficient in an nth listening period, however, the second most preferred subset of radio chains may be activated in an $(n+1)^{th}$ listening period. According to the first option, if also the second most preferred subset of radio chains yields an insufficient channel condition and no new measurement of the quality characteristic is going to be made before the next listening period, the wireless device 110 may subsequently activate either the third most preferred subset of radio chains or revert to activating the preferred subset. The first option is likely to reduce the total number of measurements of the quality characteristic. As announced, the first option is useful also for determining or modifying an operating value to be assigned to the at least one radio parameter.

According to a second option, the modified value is determined by a fresh measurement of the quality characteristic or a fresh measurement of a component of a composite quality characteristic. The second option is simple to implement and will modify the subset on the basis of a recently collected value of the quality characteristic. The second option is useful also for determining or modifying an operating value to be assigned to the at least one radio parameter.

According to a third option, the selection of the modified subset of radio chains is model-based and assisted by a sensing of a condition being one of one or more of: a position of the wireless device, an orientation of the wireless device, an altitude of the wireless device, a temperature of the wireless device, a speed of the wireless device, a meteorological condition, a condition related to energy supply of the wireless device, or a combination of two or more of these. For this purpose, the wireless device 110 may comprise one or more of the following sensors: a position sensor, an orientation sensor, an altitude sensor, a thermometer, a speed sensor, a meteorological sensor, a sensor monitoring a condition related to energy supply of the wireless device. The condition is such that it may be expected to influence, at least indirectly, the performance of the communication interface 112. A comparison of a value of the condition sensed at the time of measuring and a current value of the condition will assist the modification of the subset.

Still within the third option, two basic types of modeling are proposed. A sensitivity-oriented model is designed mainly to support a decision whether to renew the measurement of the quality characteristic or not. This may be achieved by sensing conditions indicating that the wireless device 110 is in use according to one of a plurality of predefined use types, such as resting on an immobile surface, resting on a surface of a moving vehicle, handheld, resting in a pocket, operation with limited battery voltage, outdoor/indoor, etc. Each predefined use type has an associated sensitivity. For instance, if the wireless device 110 is not moving or being reoriented with respect to serving network nodes, a measurement of the quality characteristic is likely to be reliable for a longer period of time than if the wireless device 110 is handheld (as may be evidenced by increased temperature or repeated movements), in which case the measurement may need to be renewed more often. A sensitivity-oriented model may be entirely predefined; it may contain a combination of predefined data (e.g., the use types) and locally sensed data; or it may be constructed based on locally sensed data only. A model of this type may be constructed using long-term statistics or using per se known machine learning techniques. For instance, a machine learning algorithm may be executed, either in the processing circuitry 111 of the wireless device 110 or by supporting external processing resources, to produce a model for estimating the average validity of a selected subset of radio chains in view of the available sensor data of the wireless device 110.

A correction-oriented model is designed mainly to support a decision on the correction to be applied. For instance, if the wireless device 110 on which identical antennas are mounted has been rotated in relation to serving network nodes by a known amount, it may be possible to predict what antennas will assume the role of the antennas of the previously selected subset of radio chains. A model describing the performance of a subset of radio chains in view of the quality measurement and the sensed condition may be useful for this purpose. One may alternatively use a model describing a required change in a subset of radio chains, in order to maintain equivalent performance, in view of a change in a sensed condition. Like a sensitivity-oriented model, the correction-oriented model may be predefined and pre-programmed in the software of a given type of wireless device, or may alternatively be derived by machine learning during actual use of a manufactured wireless device 110. Further alternatively, a manufactured wireless device 110 may collect long-term statistics while it is being used.

The approaches according to the third option are useful also for determining or modifying an operating value to be assigned to the at least one radio parameter.

It is believed that the advantages of the techniques presented herein will be fully understood from the foregoing description, and it will be apparent that various changes may be made in the form, constructions and arrangement of the exemplary aspects thereof without departing from the scope of the disclosure or without sacrificing all of its advantageous effects. Because the techniques presented herein can be varied in many ways, it will be appreciated that the scope of protection should be limited only by the claims.

The invention claimed is:

1. A method implemented in a wireless device equipped with a plurality of selectively operable radio chains for communicating with at least one network node, the method comprising:
measuring a quality characteristic of a signal received from the at least one network node in one of an active mode and during a listening period of an energy-saving mode;
deactivating all of the radio chains during a non-listening period of the energy-saving mode; and
after the non-listening period, activating a selected subset of the radio chains to receive a signal from the at least one network node in a first listening period, the selected subset being determined on the basis of the measured quality characteristic and at least one beam direction of the selected subset.

2. The method of claim 1, wherein the non-listening period, during which the radio chains are deactivated, lasts one of at least one ms and at least one subframe.

3. The method of claim 1, wherein:
at least one of the radio chains accepts a radio parameter controlling a variable radio-related property of the radio chain;
the quality characteristic is measured for a plurality of values of the parameter; and
the method further comprises, for each radio chain in the selected subset which accepts a radio parameter, assigning an operating value to the radio parameter on the basis of the measured quality characteristic.

4. The method of claim 3, wherein the variable radio-related property is a setting of a variable phase shifter.

5. The method of claim 3, wherein the at least one radio chain accepting a radio parameter is configured to drive a plurality of antenna elements and the operating value of the radio parameter is common to said plurality of antenna elements.

6. The method of claim 3, wherein the at least one radio chain accepting a radio parameter is configured to drive a plurality of antenna elements and the radio parameter is assignable for one antenna element independently of other antenna elements in said plurality.

7. The method of claim 1, further comprising evaluating a channel condition under which the signal from the at least one network node is received.

8. The method of claim 7, further comprising, in response to evaluating the channel condition as failing to meet a predefined threshold:
activating at least one of a modified subset of the radio chains and assigning a modified operating value to the radio parameter for one of the radio chains therein, to receive a signal from the at least one network node in a second, subsequent listening period.

9. The method of claim 8, further comprising:
sensing a condition prevailing at the time of the measuring; and
wherein the modified subset or the modified operating value is determined on the basis of a difference between the condition prevailing at the time of measuring and a sensed current value of the same or a corresponding condition.

10. The method of claim 9, wherein the condition is at least one of: a position of the wireless device, an orientation of the wireless device, an altitude of the wireless device, a temperature of the wireless device, a speed of the wireless device, a meteorological condition, and a condition related to energy supply of the wireless device.

11. The method of claim 8, wherein the at least one of the modified subset and the modified operating value is determined on the basis of a further measurement of the quality characteristic on a signal received from the network node, which measurement is performed one of in an active mode and during a listening period of an energy-saving mode.

12. The method of claim 8, wherein the at least one of the modified subset and the modified operating value is determined on the basis of long-term statistics of the measured quality characteristic.

13. The method of claim 8, further comprising, in response to evaluating the channel condition as meeting a predefined threshold:
maintaining the at least one of the subset of the radio chains and the operating value of the radio parameter for one of the radio chains therein, to receive a signal from the at least one network node in a second, subsequent listening period.

14. The method of claim 1, wherein the quality characteristic of the received signal is at least one of: received power, block error rate, frame error rate, an interference metric, signal-to-noise ratio, and signal-to-interference-plus-noise ratio.

15. A wireless device comprising:
a communication interface with a plurality of selectively operable radio chains for communicating with at least one network node; and
processing circuitry configured to cause the wireless device to:
measure a quality characteristic of a signal received from the network node in one of an active mode and during a listening period of an energy-saving mode;
deactivate all of the radio chains during a non-listening period of the energy-saving mode; and
after the non-listening period, activate a selected subset of the radio chains to receive a signal from the at least one network node in a first listening period, the selected subset being determined on the basis of the measured quality characteristic and at least one beam direction of the selected subset.

16. The wireless device of claim 15, wherein at least one of the radio chains has a variable radio-related property and is configured to accept a radio parameter controlling said radio-related property; and
the processing circuitry being further configured to:
measure the quality characteristic for a plurality of values of the parameter; and
within the selected subset, for each of the radio chains configured to accept a radio parameter controlling a radio-related property, assign an operating value to the radio parameter on the basis of the measured quality characteristic.

17. The wireless device of claim 16, wherein at least one of the at least one radio chain configured to accept a radio parameter comprises a variable phase shifter controllable by the radio parameter.

18. The wireless device of claim 16, wherein at least one of the at least one radio chain configured to accept a radio parameter is configured to drive a plurality of antenna elements and the operating value of the radio parameter is common to said plurality of antenna elements.

19. The wireless device of claim 16, wherein at least one of the at least one radio chain configured to accept a radio parameter is configured to drive a plurality of antenna elements and the radio parameter is assignable for one antenna element independently of other antenna elements in said plurality.

20. The wireless device of claim 16, further comprising a sensor configured to sense a condition; and the processing circuitry is further configured to:
 determine, on the basis of a difference between the condition prevailing at the time of measuring the quality characteristic and one of a sensed current value of the same and a corresponding condition, a modified operating value of a radio parameter of one of the radio chains; and
 assign the modified operating value to the radio parameter, to receive a signal from the at least one network node in a second, subsequent listening period.

21. The wireless device of claim 20, wherein the sensor is one or more of: a position sensor, an orientation sensor, an altitude sensor, a thermometer, a speed sensor, a meteorological sensor, a sensor monitoring a condition related to energy supply of the wireless device.

22. The wireless device of claim 15, wherein the non-listening period, during which the radio chains are deactivated, lasts one of at least one ms and at least one subframe.

23. The wireless device of claim 15, wherein the wireless device is a user equipment.

24. A computer-readable medium storing an executable computer program which, when executed by a wireless device equipped with a plurality of selectively operable radio chains for communicating with at least one network node, performs a method comprising:
 measuring a quality characteristic of a signal received from the at least one network node in one of an active mode and during a listening period of an energy-saving mode;
 deactivating all of the radio chains during a non-listening period of the energy-saving mode; and
 after the non-listening period, activating a selected subset of the radio chains to receive a signal from the at least one network node in a first listening period, the selected subset being determined on the basis of the measured quality characteristic and at least one beam direction of the selected subset.

* * * * *